United States Patent [19]

Montalescot et al.

[11] Patent Number: 4,867,103

[45] Date of Patent: Sep. 19, 1989

[54] AUTOMATIC MILKING INSTALLATION

[75] Inventors: Jean-Bernard Montalescot, Villemoisson sur Orge; Guy Camus, Fresnes; Jean Lucas, Paris, all of France

[73] Assignee: Etablissement Public: Centre National du Machinisme Agricole du Genie Rural, des Eaux et des Forets - (Cemagref), Antony, France

[21] Appl. No.: 93,879

[22] Filed: Sep. 8, 1987

[51] Int. Cl.[4] .......... A01J 3/00

[52] U.S. Cl. .......... 119/14.08; 119/14.1; 119/14.18

[58] Field of Search .......... 119/14.1, 14.03, 14.08, 119/14.11, 14.13, 14.18

[56] References Cited

U.S. PATENT DOCUMENTS

| | | | |
|---|---|---|---|
| 4,010,714 | 3/1977 | Notsuki et al. | 119/14.03 |
| 4,805,557 | 2/1989 | van der Lely et al. | 119/14.08 |

FOREIGN PATENT DOCUMENTS

| | | |
|---|---|---|
| 0091892 | 3/1983 | European Pat. Off. . |
| 0188303 | 1/1986 | European Pat. Off. . |
| 0202202 | 11/1986 | European Pat. Off. . |
| 2007486 | 5/1979 | United Kingdom . |
| 85/02973 | 7/1985 | World Int. Prop. O. . |

*Primary Examiner*—Robert Peshock
*Assistant Examiner*—R. Thomas Price
*Attorney, Agent, or Firm*—Weingarten, Schurgin, Gagnebin & Hayes

[57] ABSTRACT

Automatic positioning of milking cups on the teats of an animal is achieved by way of an installation comprising a stall accessible to an animal, a device for calculating the coordinates of the teats of an animal in the stall, and arms carrying the cups for positioning same on the teats of an animal under the control of a signal generated as a function of the measured coordinates. The coordinates of the teats are determined using an overall sensor which is located in a fixed spot on one side of the stall and which has scanning device permitting the formation of an image of the teats, and a processing device for working out the instantaneous coordinates of the teats from the information supplied by the sensor. Four independent arms are provided, each carrying a respective cup, and each being controlled independently of the others in order to bring the carried cup to a respective teat of an animal without interfering with the movement of the other arms.

22 Claims, 7 Drawing Sheets

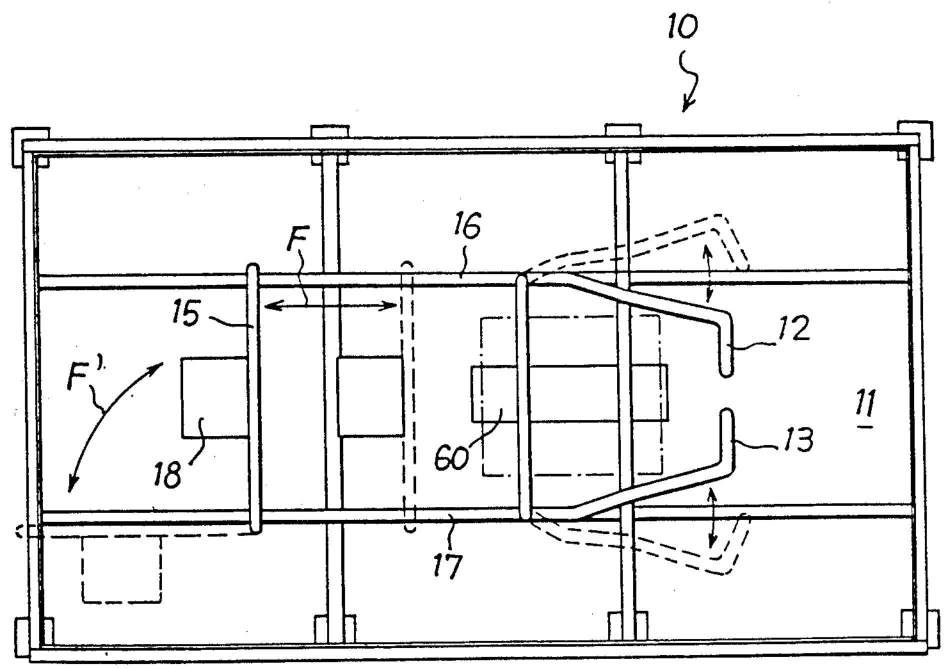
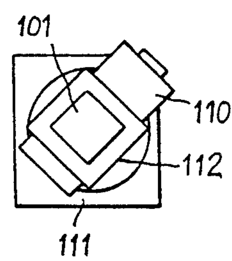
Fig-2

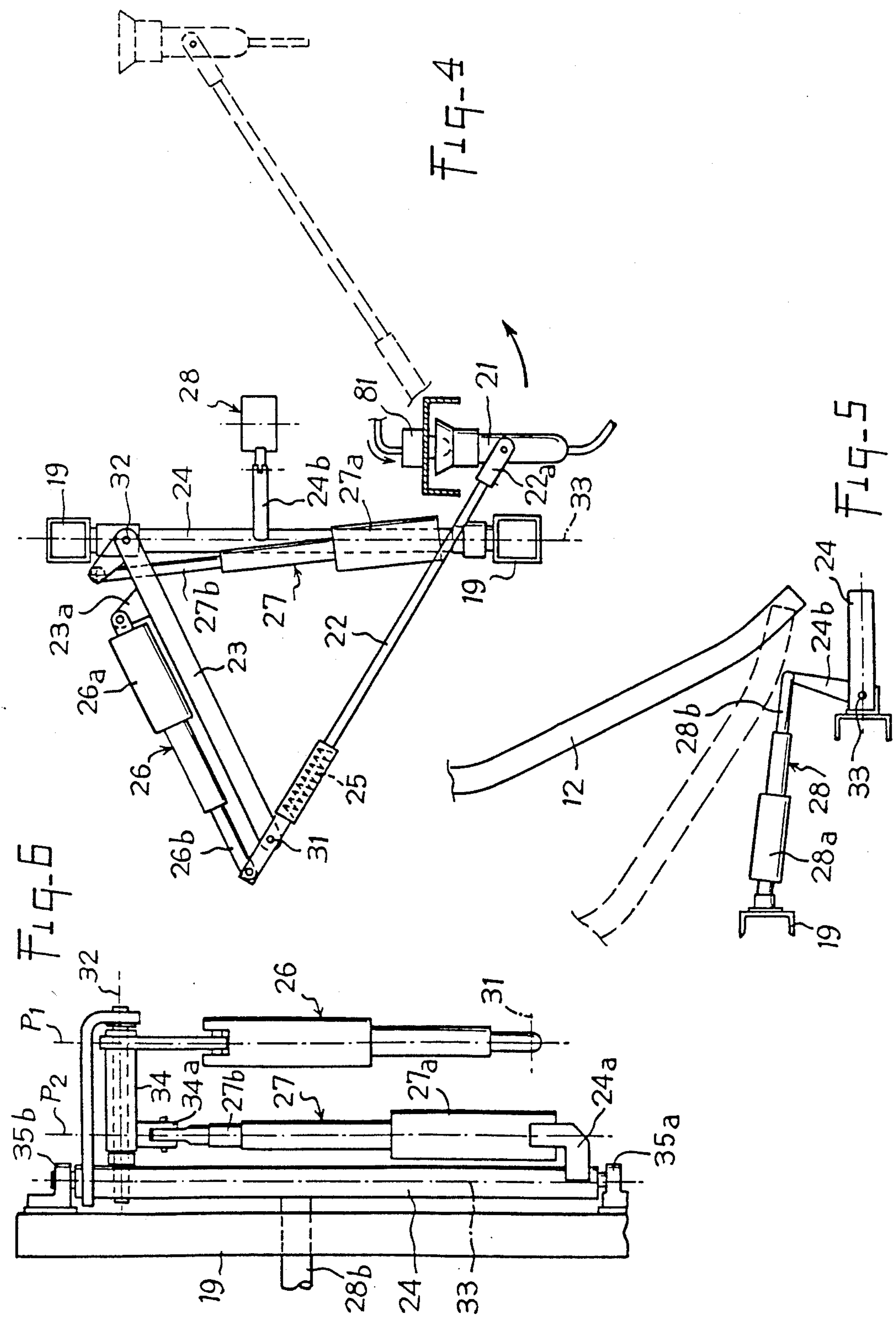

62
61
82
60
42a
41
53a
43a
46a
F1
52
48b
44
42
46
43
48
53b
48a
46b
53
27
45
19
51

44
47b
44d
55a
52
47
44b
43
47a
46
44a
44c
42
55b 71
75a
75b
70a
72
21a
70
21b
85
82
80
70d
84
21
87
22a
70b
21c 22b
83
81
80
70d
86
70c
85
22a
87
84
82

AUTOMATIC MILKING INSTALLATION

FIELD OF THE INVENTION

The present invention relates to an automatic milking installation.

BACKGROUND OF THE INVENTION

For many years now, the progress made in the field of mechanization and automation have enabled breeders specialized in milk production to improve their working conditions and their animals' production.

In addition to the automatic milking devices which have been in use for a long time now, there are also devices for the automatic identification of the animals, milk meters for measuring the production of each animal, which meters can also control the automatic release of the milking cups of the milking machine, automatic milk sampling devices which are combined with the milk meters, and concentrated fodder automatic supplying devices for dispensing to the animals the balanced milk-producing rations that they need.

However, there is at least one operation which still has to be perfomed by hand: that is the positioning of the milking cups of the milking machine on the animal' teats. A device which automatically performs this operation would eliminate the compelling need for a person to be present in the milking parlor twice a day, every day of the year.

It has also been found that the animals' production increases if they are milked every time they come up to a fodder dispensing station. A complete automatization of the milking would make it possible to conduct four to five milkings a day on each animal, which is of course impossible, from a practical and economical point of view, when some of the operations have to be performed by hand.

Devices for the automatic positioning of the milking cups have been proposed. Reference can be made in particular to the following patents or patent applications: US-4,010,714, GB-2 007 486, EP-0 091 892, WO-85/02973, EP-0 188 303 and EP-0 202 202.

These known devices are generally combined with stalls in which the animals are kept throughout the milking operation and where they are automatically fed with fodder.

In the devices described in documents US-4 010 714 and WO-85/02973, the positions of the milking cups are adjusted as a function of pre-recorded information relative to the animals' teats. Yet it is impossible to guarantee a good positioning of the teats every time, because the immobilization of the animal in the stall even with restraining means such as inflatable cushions being used (US-4 010 714), is not sufficient to ensure exact reproduction of the teats coordinates from one milking operation to another, and this, not only for different animals, but also for the same animal, due to morphology variations during lactation, from one day to another and also between two milkings.

This drawback may be overcome by measuring the position of the tests of each animal entering the stall, as proposed in documents EP-0 091 892, EP-0 188 303 and EP-0 202 202. To this effect, a position sensor, using for example, an ultra-sound transmitter-receiver system, is mounted on a support fixed on the end of movable arm and equipped with four milking cups of which the positions on the support are adjustable. There are various drawbacks in this arrangement, due to the overall dimension of the support and to the risk that the sensor can be damaged by the animal.

The same drawbacks due to overall dimensions are also found with other known devices which, likewise, use a single support for all the milking cups, such as for example the devices described in the above cited documents US-4 010 714 and WO-85/02972. The bulkiness is due not only to the fact that the movable support carries the four milking cups, but also to the fact that said support must also carry the means necessary for individually moving each milking cup with respect to the support in at least two directions. Because of such overall dimensions, the aforementioned known devices provide means for holding the animal in a position in which the support can be brought near the tests without any hindrance, said means consisting in raising the middle part of the stall floor. However, as a result, the animal is held in a strained and uncomfortable position.

Other devices have been proposed in which a single control arm is used for positioning the milking cups on the teats, one by one and successively, as described in documents GB-2 007 486 and EP-0 091 892. In such devices, the control of the arm raises problems which are difficult to solve in order to reach the teats of the animals, from one spot where the milking cups are stored, without interfering with the milking cups already in position and with the tubes to which said cups are connected. Also, time may be lost, and this is liable to affect hormonal secretion which is short-lasting, when milking cups have to be replaced on the teats after being accidentally knocked off, for example by a kick; indeed, in order to fit back a milking cup which has dropped off, it may be necessary to remove all the cups still in position, hence provoking an interruption in the milking process.

The production of devices which makes it possible to know exactly the positions of the animals' teats, and to readily position the milking cups on the teats without excessive discomfort for the animal, is not only technically difficult, it must also provide an acceptable compromise between, on the one hand, the reliability and strength of such devices, and on the other hand, their cost. On this point, it has been proposed in document EP-0 091 892 to serve a plurality of stalls with a single robot, but the difficult access to the teats may make it necessary for the robot to come so close to the animal that a kick from the latter could damage it.

SUMMARY OF THE INVENTION

It is the object of the present invention to propose a milking installation equipped with means for automatically positioning the milking cups on the teats of an animal, in secure manner and for a reasonable cost, without the need to use restraining means which are sometimes accepted with difficulty by the animal, and to use complex handling devices.

This object is reached with an installation in which, according to the invention, a teats coordinates measuring device comprises an overall sensor which is located in a fixed spot on one side of the stall and is provided with scanning means permitting the formation of an image of the teats of the animal inside the stall, and means for working out the teats instant coordinates from information supplied by the sensor; the means for positioning the milking cups comprises four independent articulated control arms, each one carrying a cup on its end, each arm being controlled separately from the others for moving the milking cup that it carries in any direction in space, in order to bring the milking cup to a respective teat of the animal without interfering with the movement of the other control arms.

By allocating one cup to each arm, it is possible to place the arms in such a way that they can bring the milking cups to the teats, simultaneously, or almost simultaneously, and independently, without any interference between the paths of the different arms. Furthermore, the fact that a cup is permanently fixed on each arm makes it possible to simplify the structure and the control of the arm, and for example, there is then no need to provide the arms with cup gripping means. Still further, re-positioning of a cup which has accidentally dropped off, can be performed rapidly and without any interruption of the milking, since the cup remains on the end of the associated arm and the path of that arm never interferes with that of the other arms.

In addition, the fixed overall sensor located on one side of the stall can be placed outside the path of the animals in the stall, reducing to a minimum the risks of damage or soiling. Also, by fitting the sensor so that it can be oriented in several directions, the same sensor can be used for several stalls. The overall sensor is for exmple of opto-electric type and comprises a light source, such as a laser source, generating a light beam, means for scanning the light beam, and an optical detector, such as a CCD camera. The light source and the camera are situated at different known locations, this permitting, as the angle of incidence of the radiated beam is also known, to work out the coordinates of the teats in space.

In one particular embodiment of the installation according to the invention, the overall sensor permits an approximate positioning of the milking cups, and respective detection means are associated to each milking cup for controlling the corresponding arm in order to complete the final positioning of the milking cup on the corresponding teat.

Preferably, said means controlling the approximate positioning of the milking cups comprises a memory for recording data representative of the teats coordinates relative to each animal to be milked and means for identifying an animal entering a stall. It is possible by reading the information stored in the memory under the control of the identifying means, to know the approximate position of the teats and, therefore, to use the stored reference values of coordinates for validating the values as worked out by means of the overall sensor and associated processing means. The knowledge of the approximate position of the teats may also enable a limitation of the analysis of the image formed on the camera to a particular zone where the teats should be found, thus enabling a faster working out of the coordinates. Advantageously, the coordinates data recorded for each animal are up-dated according to the final positioning of the milking cups.

Also, advantageously, a device is provided for adjusting the position of the front gate of the stall, said device acting in response to the means for identifying an animal entering the stall, and controlling the position of the gate so that the teats of the different animals to be milked are always situated substantially in the same zone. In this way, the zone of action of each arm can be limited.

Various dispositions of the control arms are possible.

Advantageously, at least two lower control arms are provided, said arms being movable between original positions, situated under the stall floor, and working positions in which they bring the milking cups onto two of the animals' teats, preferably the back teats. The other two control arms can be lateral arms, movable between original positions, each one situated on one respective side of the stall, and working positions in which they bring the milking cups onto the other two teats of the animal.

As a variant, the other two control arms can also be lower arms which, like the first two arms, have original positions situated under the stall floor.

It is also preferable, that after each milking operation, each control arm is returned to an initial position in which it brings the milking cup that it carries opposite a device spraying a cleaning liquid. This permits an automatic cleaning of the milk circuit of the milking machine after each milking opertion, or after a sequence of milking operations.

BRIEF DESCRIPTION OF THE DRAWINGS

The invention will be more readily understood on reading the following description with reference to the accompanying drawings, in which:

FIGS. 1 to 3 are respectively, lateral, plan and front views of a stall according to one embodiment of the automatic milking installation according to the invention, FIGS. 4 to 6 illustrate a lateral control arm with which the stall shown in FIGS. 1 to 3 is equipped.

DETAILED DESCRIPTION OF A PREFERRED EMBODIMENT

Figure 1:
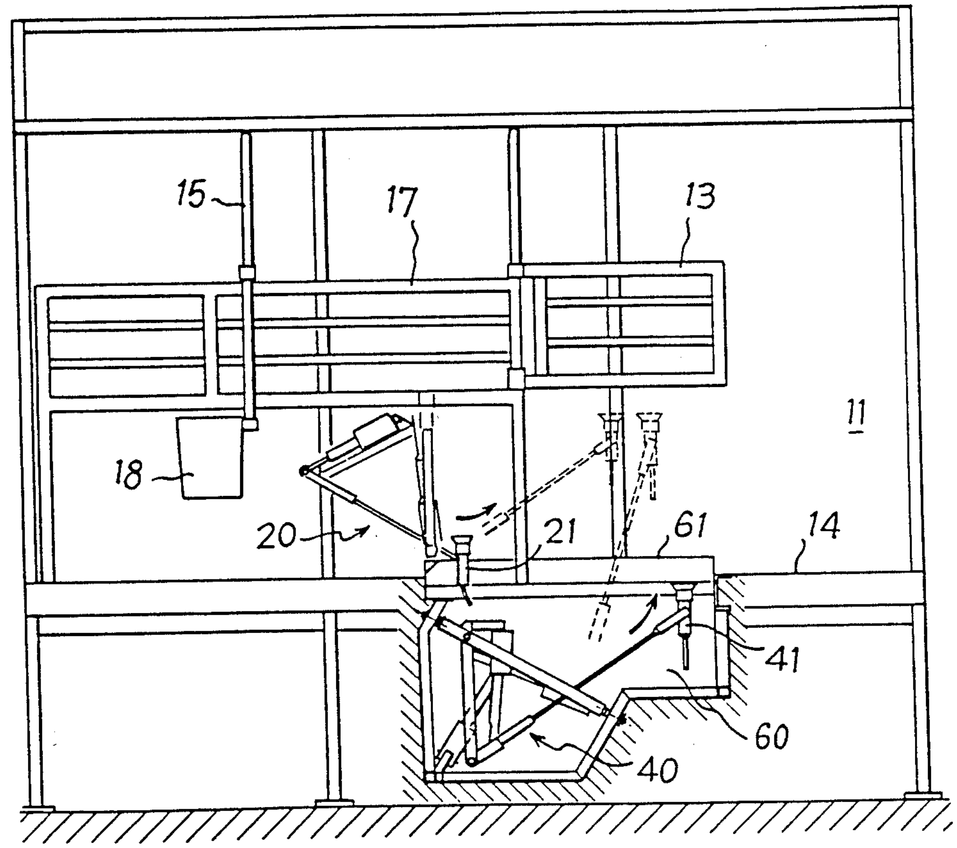
Figure 3:
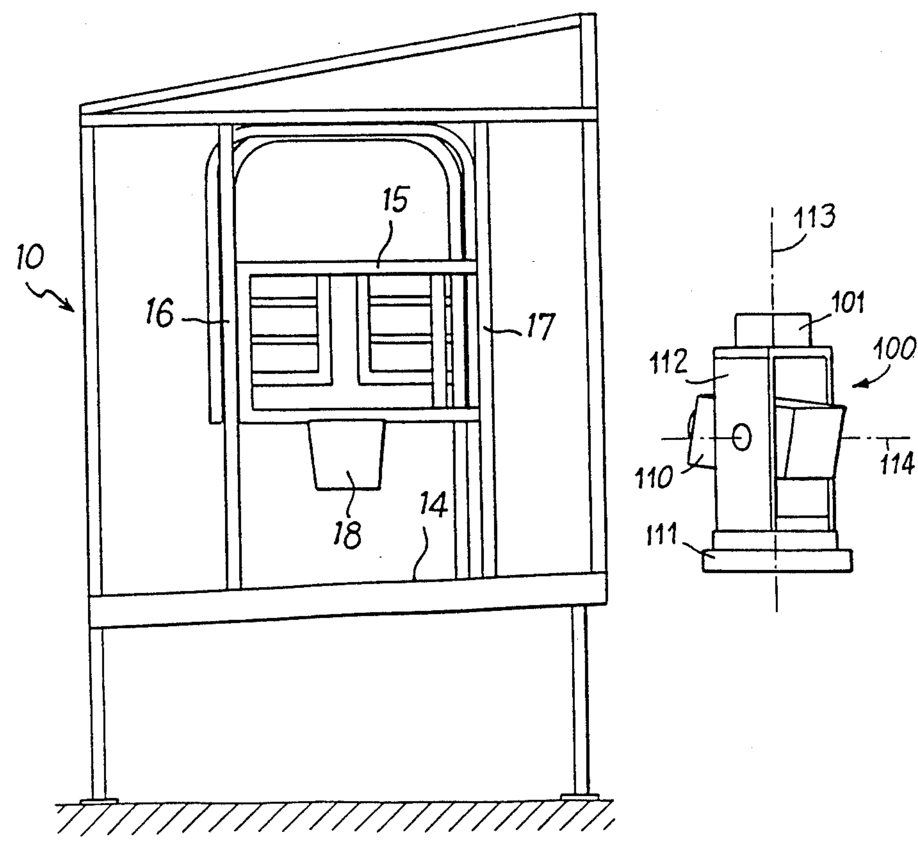

Referring first to FIGS. 1 to 3, reference 10 designates, in general, a stall in a milking installation according to the invention, said installation of course comprising a plurality of identical stalls. The stalls can be situated inside the same building or each stall can be individually protected. The animals have free access to the stalls when they want and as often as they want. It is not necessary to have a particular arrangement of the locations of the stalls, as in the conventional milking installations. Moreover, even though the animal milking operations are more frequent than they used to be, they are spread through the day. Therefore, for a whole herd of cows, the number of stalls can be notably reduced, for example by providing one stall for thirty cows instead of one stall for eight cows as is generally the case in a conventional milking hall.

Stall 10 is accessible from the rear through a passage 11 for one animal, this passage being provided, as known per se in free stalling installations, with means (not shown) for identifying the entering animal by way of an identification plate carried by said animal. The entrance way into stall 10 consists of two gates 12, 13 which are movable about vertical axes on each side of the stall.

At the front, the stall is closed by a gate 15 which is horizontally slidable (as indicated by F in FIG. 2) along sides 16, 17 of the stall under the action of jacks (not shown). Gate 15 is also mounted for pivoting about a vertical axis situated on one side of the stall (as indicated by arrow F' in FIG. 2) in order to allow the exit of the animal through the front. It will also be noted that gate 15 is equipped with a feeder 18 which can be supplied in a manner known per se by an automatic fodder dispensing system controlled by a central microprocessor unit.

It is possible, by sliding gate 15, to adjust the length of the stall in relation to the identified animal, so that the teats of any animal which has entered the stall, are always situated in the same zone A (shown in dot-dash lines in FIG. 2), regardless of the size of the animal. The entrance of an animal proceeds as follows: the animal reaching into the passage is identified and the jacks provided for sliding the front gate 15 are actuated in order to adapt the length of the stall to the animal. The back gates 12, 13 are opened (position indicated in broken lines in FIG., 2) and, when the animal has entered the stall, which can be detected by an optical type sensor provided at the front of the stall, gates 12, 13 are closed. Because of their bent shape (FIG. 2), the gates encircle the hind part of the animal, by the sides and the back, thus holding said hind part in a stationary position, and keeping the teat of each animal in substantially the same position from one milking operation to another.

Stall 10 is equipped with four control arms (not shown in FIGS. 2 and 3) permitting the automatic positioning of milking cups on the teats of an animal standing inside the stall. Each arm carries on its end a respective milking cup which is connected via a tube to a milking machine (not shown) which can be of any conventional type. In the illustrated example, the control arms are divided into two side arms and two lower arms.

The two side arms 20 (only one of which is illustrated in FIG. 1) are placed on each side of the stall and carry a milk cup on their end. Originally, each arm 20 occupies a retracted position situated on the side of the stall. In the working position, (illustrated in broken lines in FIG. 1), each arm 20 brings the milking cup 21 that it carries onto the front teat of the animal closest to the side of the stall where said arm is situated.

The other two control arms 40 (only one of which is shown in FIG. 1) are situated side by side at the lower part of the stall and carry a milking cup 41 by their ends. In the rest position, each arm 40 occupies a retracted position inside a housing 60 situated under the floor 14 of the stall 10, in the middle thereof and substantially flush with zone A. In the working position (illustrated in broken lines in FIG. 1), each arm 40 brings the milking cup 41 that it carries onto the nearest of the back teats of the animal standing in the stall.

As illustrated in FIG. 1, housing 60 is formed in a raised middle part of the floor 14, said raised part compelling the animal to keep its hind legs sufficiently apart, without discomfort. Housing 60 is closed by a gate 61 which is slidable in the longitudinal direction of the stall 10 under the action of a jack. Nozzles (not shown) can be provided inside housing 60 and near the arms 40, in order to spray a cleaning liquid onto the animal's teats before the milking operation and a disinfectant product after the milking operation. The opening of gate 61 is controlled automatically after the closure of gates 12, 13, and the closure of gate 61 is controlled after the removal of the milking cups, and optionally, the spraying of the disinfectant product.

Figure 9:
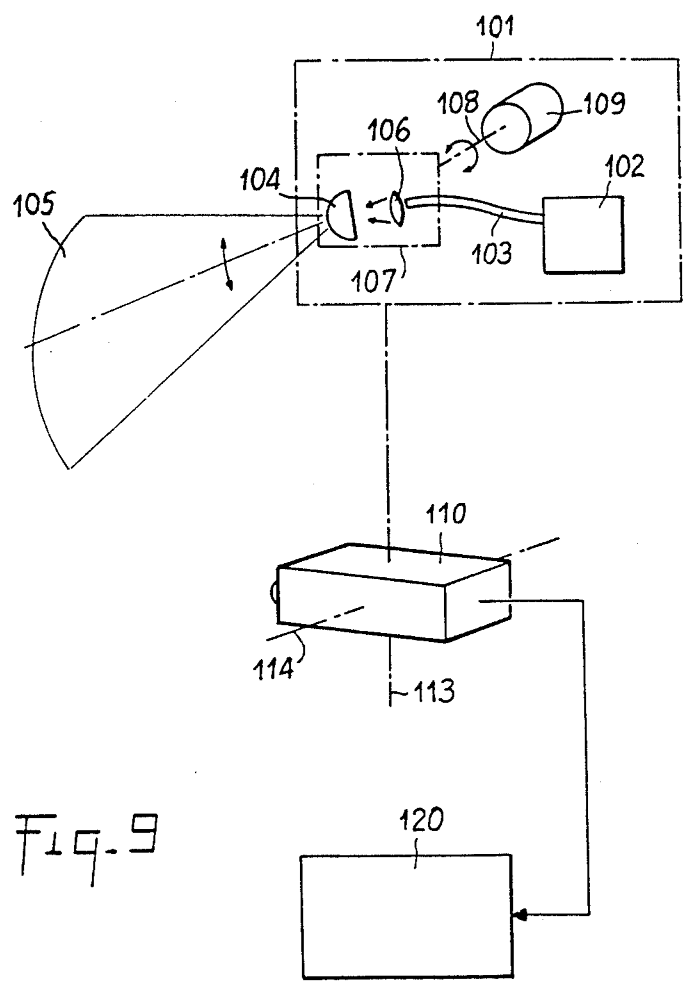
FIG. 9 is a diagram of a position sensor forming part of the installation shown in FIGS. 1 to 3.

A sensor 100 (not shown in FIG. 1) is provided in a fixed place of the stall, outside the path of the animals in the stall. Said sensor comprises an optical scanning device 101 and a camera 110 supplying the data representing the image of the teats of an animal which has entered the stall, and a data processing device 120 for working out the coordinates of the teats in order to control the arms. A detailed description of the sensor 100 is given hereinafter with reference to FIG. 9.

Reference is now made to FIGS. 4 to 6 showing in more detail the structure of a lateral control arm seen respectively, sideways, partly from the top and partly from the front.

Arm 20 is essentially composed of three portions or rods 22, 23, 24 mounted for pivoting one with respect to the other.

End rod 22 carries the milking cup 21 at a first end. Milking up 21 is borne by a support 70 which is mounted for free rotation on the fork-shaped end **22*a* of rod 22, fork 22*a* being itself freely pivotable about the longitudinal axis of rod 22. During the movement of the arm, support 70 and cup 21 normally keep, by gravity, a vertical position with respect to the upwardly directed opening of the cup. Because of its articulated assembly on the end of rodd 22, support 70 can be oriented freely during the positioning of cup 21 on the teat. One embodiment of the assembly of cup 21 in the support 70 is described hereinafter in detail with reference to FIGS. 10 and 11**.

Close to its second end, rod 22 is connected via a spring 25 to a first end of rod 23, in such a way as to be pivotable with respect to the latter about a horizontal axis 31. Because of its deformability, spring 25 can prevent the control arm from being damaged should the animal kick the rod 22 or milking cup 21. Spring 25 is however selected to have a stiffness such that the milking cup 21 cannot undergo any noticeable oscillation during normal movement of the control arm. Pivoting of rod 22 with respect to rod 23 is achieved by means of a jack 26. The cylinder **26*a* of said jack is secured to rod 23 by means of a lug 23*a*, whereas rod 26*b* of jack 26 is connected by its end to the second end of rod 22** via a spherical joint.

At its second end, rod 23 is mounted for pivoting about an axis 32 parallel to axis 31. As can be seen in FIG. 6, said second end of rod 23 is fixed to one end of a tubular sleeve 34 which is mounted for pivoting freely about axis 32. At the other end of sleeve 34 is fixed a fork **34*a* to which is joined the end of the rod 27*b* of a jack 27, via a swivel joint. The cylinder 27*a* of jack 27 is fixed to rod 24 by means of a bracket 24*a* welded on said rod. The axes of jacks 26 and 27 are situated in two vertical planes P1, P2 which are off-set one with respect to the other (FIG. 6**).

Rod 24 is mounted by its ends in bearings **35*a*, 35*b* of vertical axis 33 which are fixed on a frame 19. The rotation of rod 24 about axis 33 is achieved by means of a third jack 28 of which cylinder 28*a* is secured to the frame 19 and rod 28*b* is mounted for pivoting by its end on a bracket 24*b* fast with rod 24**.

Jacks 26, 27, 28 are for example screw jacks actuated by electric motors. The passage of arm 20 to the working position is controlled by sending to the motors of the jacks, signals relative to the data of the set position of the milking cup 21 carried by arm 20. As will be seen hereinafter, the set position is worked out from position sensor signals. Axes 31, 32, 33 offer the degrees of freedom necessary to bring the milking cup to the desired position. The rotation about vertical axis 33 moves the cup towards the inside of the stall. It will be noted that axis 33 is parallel and adjacent to the rotation axis of the gate situated on the same side (in FIG. 5, gate 12 is only partly shown). The pivoting movements about axes 31 and 32 permit the adjustment of the length of arm 20 and of the height of milking cup 21 carried by said arm. A working position of arm 20 is illustrated in broken lines in FIG. 4.

An embodiment of a lower control arm 40 is now described with reference to FIGS. 7 and 8 which illustrate the arm, seen respectively, sideways inside housing 60, and partly in the direction of arrow F1 of FIG. 7.

Similar to arms 20, each arm 40 essentially comprises three portions 42, 43, 44, all three being inter-articulated.

The end portion is a rod 42 carrying a milking cup 41 at one end. Milking cup 41 is carried by a support 80, which support is mounted for free rotation on the fork-shaped end 42*a* of rod 42, said fork 42*a* itself being freely rotatable about the longitudinal axis of rod 42. Thus, while the arm is moving, the support 80 and the milking cup 41 remain substantially vertical under the action of gravity and the opening of milking cup 41 is permanently facing upwardly. By its articulated assembly on the end of rod 42, the support 80 can be oriented freely when the milking cup 41 is positioned on the teat.

By its second end, rod 42 is joined via a spring 45 to a first end of the portion or rod 43 so as to be pivotable about the latter about a substantially horizontal axis 51 perpendicular to the longitudinal direction of the stall. Spring 45 is identical in structure and function to spring 25 provided on each arm 20. The pivoting movement of rod 42 with respect to rod 43 is achieved by means of a jack 46 of which the cylinder 46*a* is fixed to rod 43 via a bracket 43*a* and of which the rod 46*b* is articulated by its end on rod 42 close to its junction with rod 43.

By its second end, rod 43 is mounted for pivoting with respect to portion 44 about an axis 52 parallel to axis 51. As illustrated in FIG. 8, the second end of rod 43 is fixed to one end of a rod materializing axis 52. Said axis 52 is mounted for free rotation between two bars 44*a*, 44*b*, and is fast, close to its other end, with a connecting piece 52*a* on which is pivotally mounted the end of the rod 47*b* of a jack 47. Bars 44*a*, 44*b* are joined up at their ends in order to form an elongated frame which constitutes the third section 44 of control arm 40. Cylinder 47*a* of jack 47 is fixed to frame 44 via a tie piece 44*c*.

Frame 44 is pivotally mounted via pins 53*a*, 53*b* which are carried by frame 19 and which penetrate into bearings 55*a*, 55*b* formed on the ends of frame 44. Pins 53*a*, 53*b* define a rotation axis 53 which is inclined with respect to the horizontal and perpendicular to axes 51 and 52. Rotation of the frame 44 about axis 53 is achieved by means of a jack 48 of which the rod 48*b* is articulated by its end on a bracket 44*d* provided on bar 44*b* and of which the cylinder 48*a* is fixed to frame 19.

Jacks 46, 47, 48 can also be in the form of screw jacks actuated by electric motors. The passage of arm 40 to the working position is controlled by sending to the motors of the jacks, signals relative to the data of the set position of the milking cup 41 carried by arm 40. Axes 51, 52, 53 offer the degree of freedom necessary to bring the milking cup 41 to the desired position. The rotation about axis 53 permits the adjustment of the transversal position of the milking cup 41 whereas the length of arm 40 and the height of milking cup 41 are essentially adjusted by pivoting movements about axes 51, 52.

Figure 7:
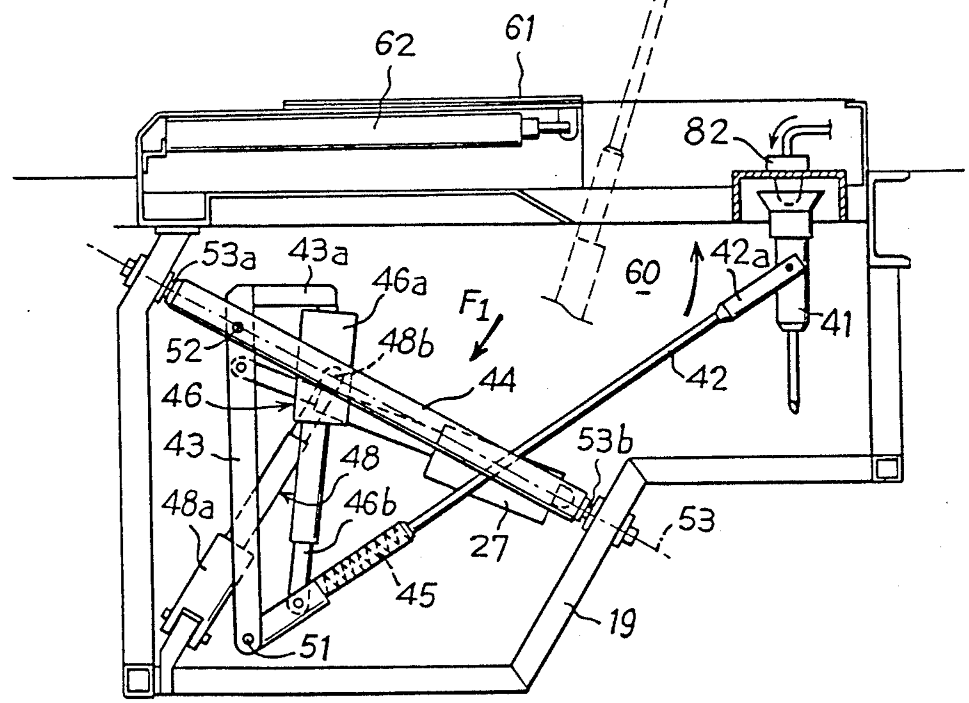
FIGS. 7 and 8 illustrate one of the lower control arms with which the stall of FIGS. 1 to 3 is equipped.
Figure 8:
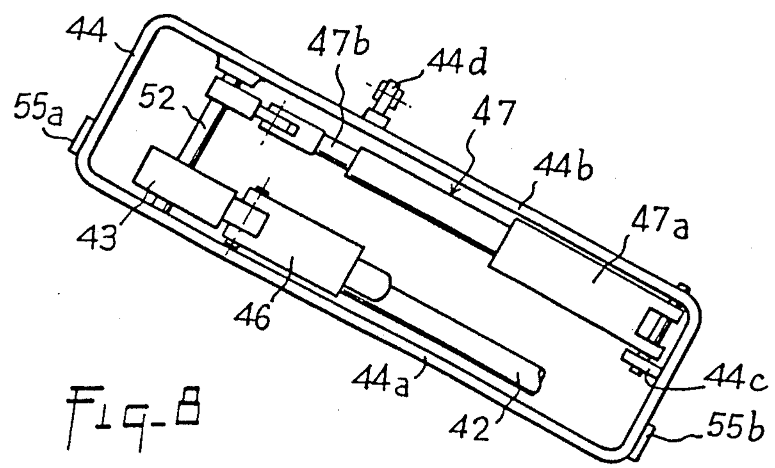

FIG. 7 shows the elements of frame 19 defining housing 60, as well as the gate 61 and the jack 62 operating it. Said figure also shows in broken lines a working position of arm 40.

It will be noted from the foregoing that each control arm only has three controlled axes with two free rotations on the connection with the cup support. This relatively simple structure of the control arms contributes to combining reliability and strength with a reasonable cost and, as already indicated, the four arms will permit the simultaneous positioning of the milking cups without any risk of their paths crossing one another. It is possible, in order to reinforce the security brought by mounting the arm end rods on springs, to add closeness detection systems, operating for example with ultrasonic waves. Such systems, mounted on the control arms, will prevent shocks by controlling the retraction of the arm when the arrival of a body, imparted with a certain speed is detected such as for example a cow's hoof, or a neighbouring arm oscillating after being kicked off by a cow.

Although it is proposed to divide the arms into two lower arms and two lateral arms, other dispositions are also possible. For example, instead of the two lateral arms, it is possible to provide two additional lower arms which, like arms 40, have original positions under the stall floor.

In the described embodiment, the milking cups are fixed onto the animal's teats by combining an approximate positioning with a final positioning of the control arms.

The approximate positioning is obtained by controlling the four arms from information supplied by the overall sensor 100 and representing the coordinates of the teats of the animal standing in the stall. One embodiment of the overall sensor is diagrammatically illustrated in FIG. 9.

The optical scanning device 101 comprises a light source, such as a laser source 102. The beam produced by said source is conveyed by an optical fiber 103 to a cylindrical lens 104 to form a light plane 105. The beam directed onto the cylindrical lens is focussed by means of an appropriate optical device such as a lens 106 situated on the end of the optical fiber.

The end of fiber 103 which carries the lenses 104 and 106 is mounted in a support 107 which is pivotable about a horizontal axis 108 under the control of a step motor 109. A vertical scanning by light plane 105 is obtained by controlling the pivoting movement of the end of optical fiber 103, in one direction or the other, by means of motor 109. The scanning is carried out so as to cover the zone in which the teats of any animal standing in stall are situated.

The camera 110 is mounted on the same stand 111 as that supporting scanning device 101, but at some distance from the latter. Stand 111 is placed on one side of the stall, on the floor thereof or at the same level as the floor. In the illustrated example (FIG. 3), the camera 110 is situated at a lower level than the scannning device, and below the latter. For example, a CCD camera can be used, i.e. a camera using CCD (charge coupled device) components.

Camera 110 is fixed onto a support 112 mounted on the stand 111 so as to permit an orientation of the camera about a vertical axis 113 by rotation of the support 112 with respect to the stand 111 and about a horizontal axis 114 by rotation of the camera with respect to the support 112. Thus, after having been mounted in support 112, camera 110 can be oriented in such a way as to sight a working zone where the teats of the animal standing in the stall are situated.

The image formed on camera 110 of the lines produced on the udder and the teats by the scanning of the light plane is digitalized and analyzed by the processing device 120 in order to identify the discontinuous lines produced by the scanning of the teats and to recognize the position of the latter. When the position of a teat inside the image formed on camera 110 is identified, the coordinates of that teat can be worked out by the processing device 120 by simple triangulation, knowing the respective positions of the scanning device and of the camera and their orientations.

Advantageously, the data processing device 120 comprises a read-only memory storing reference data representing the assumed characteristics of the teats of each animal liable to enter the stall. Thus, when an animal has entered the stall and has been identified, the reference data relative to that animal are read in memory 120, whereby the approximate location where the teats should normally be found may be known.

In order to take into account the evolution of the animal's morphology, the reference coordinates are advantageously updated daily by replacing the stored data with data corresponding to the milking cups data after the final positioning described hereinafter.

The knowledge of the reference coordinates may be used to limit the analysis of the image to the portion thereof where the teats should normally appear, thus reducing the time necessary for computing the actual coordinates. The reference coordinates may also allow a validation of the computed coordinates only when the latter differs from the reference coordinates by an amount not exceeding a given threshold.

The coordinates for each teat identified on the image are worked out, this necessarily including the coordinates of the teat nearest to the camera. If only the coordinates of two or three teats can be worked out, despite having positioned the sensor 100 in such a way where normally the four teats can be "viewed", the coordinates of the remaining teat or teats are worked out from the stored reference coordinates.

When the coordinates of all the teats have been worked out, the control arms are controlled so as to bring the milking cups onto these teats. Said control arms can be controlled simultaneously or sequentially, the measurements of coordinates being continued throughout the movement of the arms. The preferred procedure for fixing the milking cup successively onto the teats, is to start with the cup corresponding to the farthest teat, and to end with the cup corresponding to the nearest teat, in order to continue measuring the coordinates of the latter as long as possible.

Positioning of the milking cups according to the worked out coordinates is continued until the teats reach the field of action of the detectors associated to the different milking cups and designed to allow the final positioning thereof, the arms then being still under the control of the processing device 120, but in response to the signals received from the detectors.

Processing device 120 includes a microprocessor unit for carrying out programs stored in an associated memory to perform the analysis of the image formed on the camera and to control the movements of the arms. The portions of the teats in the image are determined by applying any known process for image analysis and form recognition. The control signals for the arms are produced as a function of the computed coordinates as in other known robotized systems.

The detectors associated with the different cups 21, 41 are carried by supports 70, 80. These detectors being identical, one of the detectors 71 associated with cups 21 will be described hereinafter with reference to FIGS. 10 and 11.

Figure 10:
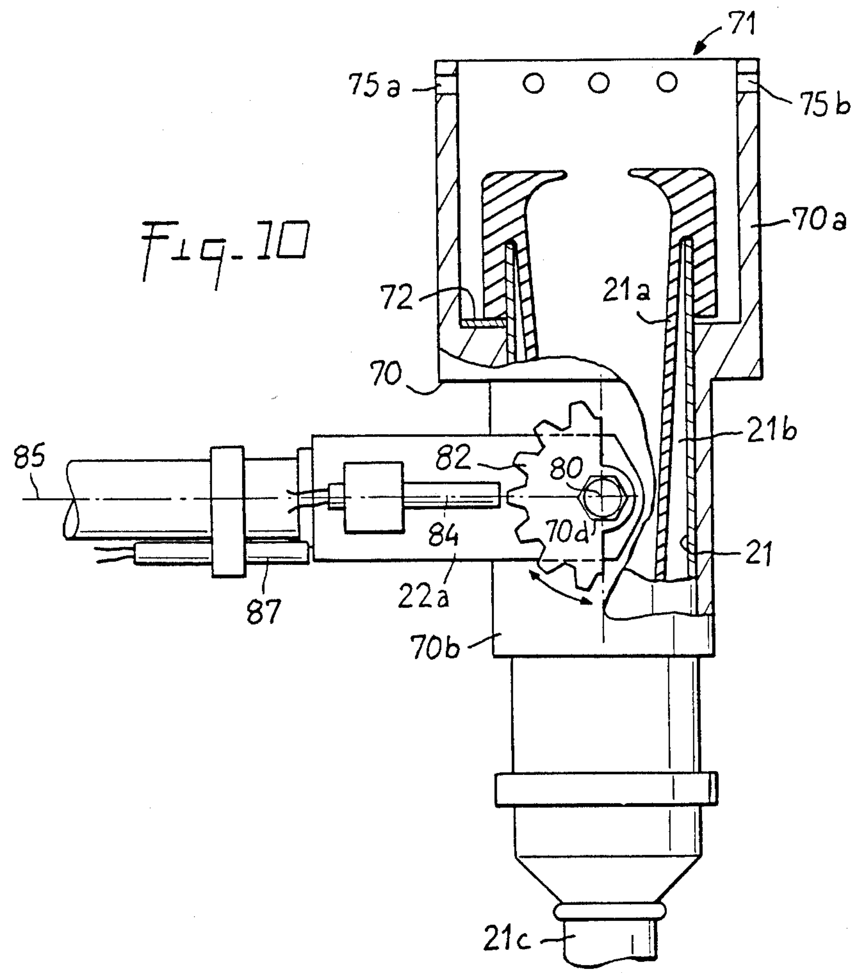
FIG. 10 is an elevational and partly cross-sectional view and FIG. 11 is a plan view of a milking cup with associated detector and sensors, which are carried on the end of each of the arms with which the stall shown in FIGS. 1 to 3 is equipped.

As shown in FIG. 10, cup 21, for example in stainless steel, supports a milking sleeve **21*a* in rubber, defining therewith an annular space 21*b*. Said sleeve 21*a* is open at its upper end and is connected to a milking machine (not shown) via a pipe 21*c*. In conventional manner, said machine comprises a source of vacuum, so that during the milking process, a permanent depression can be kept inside pipe 21*c*, and the setting up of a depression inside said annular space 21*c*** can be alternated with a return to atmospheric pressure.

Cup 21 is mounted in tubular support 70 so as to be vertically movable with respect to the latter. As illustrated in FIG. 10, the cup rests by its upper part on a set-back portion in the inner wall of support 70. Studs **70*c* are formed on the lower part 70*a* of circular cross-section of support 70, to enable the fitting a fork 22*a* by means of a lock-screw 70*d*. Thus, cup 21 is supported by arm 20 via support 70**.

At its upper part **70*b*, support 70 has a substantially square cross-section (FIG. 11) and carries a detector 71** formed by a set of optical transmitting-receiving systems, such as for example systems working in infrared.

A switch 72 having contacts borne by blades is interposed between support 70 and milking cup 21 to open when cup 21 raises with respect to support 70, the opening of the switch stops the movement of arm 20.

A varient switch 72 may be in the form of a reed switch embedded in support 70, for instance at the base of upper part **70*b*, and cooperating with a magnet borne by the milking sleeve 21*a***.

Detector 71 comprises a plurality of transmitters **75*a* provided on a first side of the upper part 70*b* of support 70 and cooperating with respective receivers 75*b* situated on the opposite side (FIG. 10). Similarly, a plurality of transmitters 76*a* are provided on a side adjacent to the first one, said transmitters cooperating with respective receivers 76*b* provided on the opposite side. The transmitter-receiver couples 75*a*–75*b* and 76*a*–76*b* define conventionally a grid through the top opening of support 70 in order to give information of the position of the teat with respect to the center of said opening. Transmitters 75*a*, 76*a* are for example infrared-transmitting light emitting diodes whereas receivers 75*b*, 76*b***, are opto-electric converters such as for example, phototransistors.

Transmitters **75*a*, 76*a* and receivers 75*b*, 76*b* are connected via conductors to a circuit printed on a board advantageously mounted on support 70, for example at the base of upper part 70*b***. Said board, by being mounted on the detector, permits local processing of the signals, thereby limiting the number of connections with the central processing device. Conductors and board are embedded in an insulating material.

The teat position information derived from the signals delivered by the receivers enables the control of the arm during the final positioning in such a way as to keep the teat substantially in the center of the opening of support 70. During said final positioning, the arm is particularly moved upwardly to engage the teat in the milking sleeve 21a. When the support reaches a position such that the milking sleeve 21a is applied on the teat under the vacuum effect, the sleeve is vertically lifted off the support 70, which causes the opening of switch 72 and stops the movement of the arm.

In the above example, the detector 71 uses infrared transmitting-receiving systems. But of course, other position detection systems can be used such as for example tactile-type sensors which are also mounted in the cups.

When the cups' final positioning is completed, the milking operation can begin. The fact that each cup can move vertically with respect to its support, authorizes verical movements of the teats during milking without any pulling action being exerted on the teats by the arms.

Means are advantageously provided to adjust the position of the arms during milking so as to maintain the milking cups in a substantially upright position despite possible movements of the animal in the stall.

To this effect, detectors are provided at the ends of the arms to detect movement of the milking cups, on the one hand, by rotation of the cups with respect to the forks which carry the cups and, on the other hand, by rotation of the forks about the axis of the end rods of the arms carrying the forks.

Figure 11:
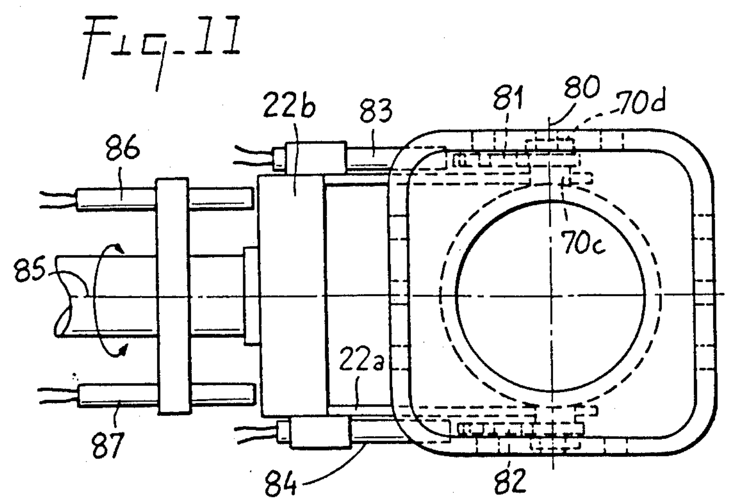

As shown in FIGS. 10 and 11, toothed wheels or sectors 81, 82, fast with support 70, are fixed on studs 70c and cooperate with proximity sensors 83, 84 fixed on the fork 22a. Thereby, rotation of support 70 and cups 21 about axis 80 materialized by studs 70c is detected by sensors 83, 84. Toothed wheels 81, 82 are identical but are slightly off-set with respect to each other so that the direction of rotation of support 70 may be known.

Similarly, proximity sensors 86, 87 are fixed on end rod 22, close to fork 22a, to detect a rotation of fork 22a and support 70 about the longitudinal axis 85 of rod 22. As shown in FIGS. 10 and 11, sensors 86, 87 cooperate with rear face 22b of fork 22a. The sensors 86, 87 are mounted in such a way that, when the fork 22a and support 70 are in normal position, the end portions of face 22b lie in the proximity of sensors 86, 87 whereas, when fork 22a starts rotating about axis 85, face 22b is moved away first from one of sensors 86, 87, depending on the direction of rotation, and then eventually from the other sensor.

Signals provided by the proximity sensors are transmitted to processing device 120 to control, in case of need, a modification of the positions of the arms so as to maintain the cups in a substantially upright position.

When the end of milking is detected, for example by detection of the quality of milk obtained, as known per se, release of the milking cup is controlled by returning the control arms to their original positions which are predetermined fixed positions.

Advantageously, in their original position, the control arms bring the milking cups 21, 41 opposite nozzles spraying a cleaning liquid. Understandably near the original position, the path of each arm is determined so as to allow the engagement of the milking cup under the cleaning nozzle, or its release therefrom. The nozzles are diagrammatically illustrated at 81 and 82 in FIGS. 4 and 7 only. Cleaning of the milk circuit of the milking machine is then achieved by spraying cleaning liquid through the cups.

A cleaning operation can be conducted after each milking operation. However, when several milking operations are conducted successively at very short intervals, a systematic cleaning after each milking is not essential; it is even undesirable because of the risk for the milk to be watered down by any liquid left in the milk circuit. Therefore, timing means can be provided to start off a cleaning cycle after a milking operation only if no other animal enters the stall in a given time interval after said milking operation. It is understood that in order to prevent too long a time period elapsing between two cleaning operations if too many animals are milked in succession and without interruption, a cleaning operation will have to be controlled if the time elapsing since the last cleaning operation exceeds a pre-set value.

The milking installation according to the invention of which an embodiment has been described hereinabove, is remarkable in that it has made it possible to mechanize, economically and reliably, an operation which heretofore was still requiring a manual intervention. The automatic positioning and release of milking cups can be integrated into a computerized system which also covers dispensing of food, measurement of the milk production, sampling of the milk, monitoring of fertility, etc. thereby permitting a complete mechanization of the production and the completely computerized control of a herd.

What is claimed is:

1. An automatic milking installation comprising:

a mechanical milking device having milking cups designed to be positioned on the teats of an animal to be milked;

at least one stall accessible to an animal;

four independent articulated arms, each carrying a milking cup on one end and being individually controllable separately from the other arms;

means connecting each milking cup to its respective arm while allowing a relative movement therebetween in at least two different directions;

teat position detecting means comprising an overall sensor provided with scanning means permitting formation of an image of the teats of an animal inside the stall;

processing means connected to said teat position detecting means for calculating a teat's instant coordinates from information supplied by the teat position detecting means and for individually controlling the movement of each arm to bring the teat cup that it carries to a respective teat of an animal inside the stall, without interfering with the movement of the other arms; and displacement sensing means associated with each arm for sensing a relative movement between each arm and the milking cup connected thereto;

said processing means being further responsive to information supplied by each of said displacement sensing means to cause the position of the corresponding arm to be modified to compensate for a relative movement between said corresponding arm and the milking cup connected thereto due to a movement of an animal being milked inside the stall.

2. An automatic milking installation as claimed in claim 1 wherein said teat position detecting means further comprises individual detectors associated with each milking cup for carrying out position information representative of the relative position between a milking cup and a teat of an animal inside the stall when the milking cup has been brought into the vicinity of the teat.

3. An automatic milking installation as claimed in claim 2, wherein said overall sensor is located in a fixed spot on one side of the stall.

4. An automatic milking installation as claimed in claim 1, wherein each of said arms is provided at said one end with a rod carrying the corresponding milking cup and connected to a remaining part of the arm by means of an elastically deformable device to allow the arm to withstand a kick from an animal inside the stall without being damaged.

5. An automatic milking installation as claimed in claim 1, further comprising:

memory means for storing information identifying coordinates representing presumed positions of the teats of every animal to be milked when standing inside the stall; and means for identifying an animal entering the stall to control reading of coordinate information in said memory means as a function of an identification of an animal entering the stall.

6. An automatic milking installation as claimed in claim 1, wherein said arms comprise at least two lower arms movable between original positions, situated under the stall floor, and working positions in which they bring the milking cups that they carry onto two respective teats of an animal inside the stall.

7. An automatic milking installation as claimed in claim 6, wherein said lower arms are, in their original positions, located inside a housing which is formed in a raised middle part of the stall floor and which is closed off by a removable cover.

8. An automatic milking installation as claimed in claim 1, wherein said arms comprise at least two lateral arms movable between original positions, each one situated on a respective side of the stall, and working positions in which they bring the milking cups that they carry onto two respective teats of an animal inside the stall.

9. An automatic milking installation as claimed in claim 1, further comprising means for cleaning the teats of an animal to be milked, said cleaning means being provided in a housing which is formed in a raised middle part of the stall floor and which is closed by a removable cover.

10. An automatic milking installation as claimed in claim 1, wherein each milking cup is mounted to be vertically movable relative to a support carried by the corresponding arm, and switching means are provided between each milking cup and its support in order to control stopping of the movement of the corresponding arm in response to the milking cup raising from its support.

11. An automatic milking installation as claimed in claim 10, wherein said displacement sensing means are provided for sensing a relative movement between each arm and the milking cup support carried thereby.

12. An automatic milking installation as claimed in claim 1, further comprising milking cups cleaning means having nozzles through which a cleaning liquid can be sprayed, said arms being controllable to be moved to positions into which they bring the milking cups that they carry opposite said nozzles.

13. An automatic milking installation comprising:

a mechanical milking device having milking cups designed to be positioned on the teats of an animal to be milked;

at least one stall accessible to one animal;

four independent articulated arms, each carrying a milking cup on one end and being individually controllable separately from the other arms;

means connecting each milking cup to its respective arm while allowing a relative movement therebetween in at least two different directions;

teat position detecting means comprising: an overall sensor which is located in a fixed spot on one side of the stall and which is provided with scanning means permitting the formation of an image of the teats of an animal inside the stall; and individual detectors associated with each milking cup for carrying out position information representative of the relative position between a milking cup and a teat of an animal inside the stall when the milking cup has been brought into the vicinity of the teat; and processing means connected to said teat position detecting means for working out teats instant coordinates from information supplied by the teats position detecting means and for individually controlling the movement of each arm to bring the teat cup that it carries to a respective teat of an animal inside the stall, without interfering with the movement of the other arms.

14. An automatic milking installation as claimed in claim 13, further comprising:

displacement sensing means associated with each arm for sensing a relative movement between each arm and the milking cup connected thereto;

said processing means being further responsive to information supplied by each of said displacement sensing means to cause the position of the corresponding arm to be modified to compensate for a relative movement between said corresponding arm and the milking cup connected thereto due to a movement of an animal being milked inside the stall.

15. An automatic milking installation as claimed in claim 13, wherein each of said arms is provided at said one end with a rod carrying the correpsonding milking cup and connected to a remaining part of the arm by means of an elastically deformable device to allow the arm to withstand a kick from an animal inside the stall without being damaged.

16. An automatic milking installation as claimed in claim 13, further comprising:

memory means for storing information identifying coordinates representing presumed positions of the teats of every animal to be milked when standing inside the stall; and means for identifying an animal entering the stall to control reading of coordinated information in said memory means as a function of an indentification of an animal entering the stall.

17. An automatic milking installation as claimed in claim 13, wherein said arms comprise at least two lower arms movable between original positions, situated under the stall floor, and working positions in which they bring the milking cups that they carry onto two respective teats of an animal inside the stall.

18. An automatic milking installation as claimed in claim 13, wherein said arms comprise at least two lateral arms movable between original positions, each one situated on a respective side of the stall, and working positions in which they bring the milking cups that they carry onto respective teats of an animal inside the stall.

19. An automatic milking installation as claimed in claim 13, wherein said lower arms are, in their original positions, located inside a housing which is formed in a raised middle part of the stall floor and which is closed by a removable cover.

20. An automatic milking installation as claimed in claim 13, further comprising means for cleaning the teats of an animal to be milked, said cleaning means being provided in a housing which is formed in a raised middle part of the stall floor and which is closed by a removable cover.

21. An automatic milking installation as claimed in claim 13, wherein each milking cup is mounted to be vertically movable relative to a support carried by the corresponding arm, and switching means are provided between each milking cup and its support in order to control the stopping of the movement of the corresponding arm in response to the milking cup raising from its support.

22. An automatic milking installation as claimed in claim 13, further comprising milking cups cleaning means having nozzles through which a cleaning liquid can be sprayed, said arms being controllable to be moved to positions into which they bring the milking cups that they carry opposite said nozzles.

* * * * *

UNITED STATES PATENT AND TRADEMARK OFFICE
CERTIFICATE OF CORRECTION

PATENT NO. : 4,867,103

DATED : September 19, 1989

INVENTOR(S) : Jean-Bernard Montalescot, et al.

It is certified that error appears in the above-identified patent and that said Letters Patent is hereby corrected as shown below:

In the Abstract, on line 10, "which has scanning" should read --which has a scanning--.
In Column 1, line 25, "animal'" should read --animals'--.
In Column 1, line 61, "tests" should read teats--.
In Column 1, line 65, "of movable arm" should read --of a movable arm--.
In Column 2, line 15, "the tests" should read --the teats--.
In Column 4, line 17, "opertion" should read --operation--.
In Column 6, line 25, "rodd" should read --rod--.
In Column 11, line 14, "verical" should read --vertical--.
In Column 14, line 54, "coordinated" should read --coordinates--.

Signed and Sealed this

Twenty-first Day of April, 1992

*Attest:*

HARRY F. MANBECK, JR.

*Attesting Officer* *Commissioner of Patents and Trademarks*